INVENTOR.
JAMES A. CANTER
BY
Richard G. Stahl
ATTORNEY

United States Patent Office 3,399,333
Patented Aug. 27, 1968

3,399,333
SPEED CONTROL CIRCUIT FOR SINGLE PHASE ALTERNATING CURRENT INDUCTION MOTORS
James A. Canter, Dayton, Ohio, assignor to General Motors Corporation, Detroit, Mich., a corporation of Delaware
Filed Jan. 3, 1966, Ser. No. 519,400
1 Claim. (Cl. 318—227)

ABSTRACT OF THE DISCLOSURE

A speed control circuit which is sensitive to conditions of ambient temperature to vary the speed of a single phase alternating current induction motor. The parallel combination of a silicon controlled rectifier and an oppositely poled conventional diode is connected in series with the motor to be controlled and a source of alternating current potential. A resistance divider network including at least one temperature sensitive resistance device is connected across the alternating current source to provide a control signal for the silicon controlled rectifier at a time as determined by existing conditions of the influencing temperature.

The present invention relates to motor speed control circuits and, more specifically, to a speed control circuit for single phase alternating current induction motors.

Single phase alternating current induction motors have a phase or running winding which may be connected across a single phase alternating current potential source and which generally includes a plurality of coils. The number of coils per running winding varies with different motors, depending upon the number of poles designed into the motor.

Motors of this type normally operate at a constant, fixed speed which is determined by the frequency of the alternating current supply potential and the number of magnetic poles produced by the running winding.

In certain applications where motors of this type may be advantageously employed, it may be desirable to operate the motor at variable speeds. To change the speed of alternating current induction motors, it has heretofore been necessary to change the frequency of the alternating current supply potential or the number of magnetic poles produced by the running winding. Both of these alternatives have been unsatisfactory in that the former requires expensive frequency conversion equipment and the latter provides, at best, step by step speed control through complex switching arrangements.

It is, therefore, an object of this invention to provide an improved speed control circuit for single phase alternating current induction type motors.

It is another object of this invention to provide an improved speed control circuit for single phase alternating current induction type motors wherein the condition angle of selected half cycles of a single phase alternating current supply potential may be selectively varied.

In accordance with this invention, a speed control circuit for single phase alternating current induction type motors is provided wherein a controllable switching device, of the type having two current carrying electrodes and a control electrode and characterized by the ability to be triggered to conduction upon the application of a control signal to the control electrode thereof, connected across circuitry suitable for connection to external circuitry is triggered to conduction by a control signal, which may be produced at any selected electrical angle between 0 degrees and 90 degrees of selected half cycles of an alternating current supply potential, applied to the control electrode thereof.

Figure 1:
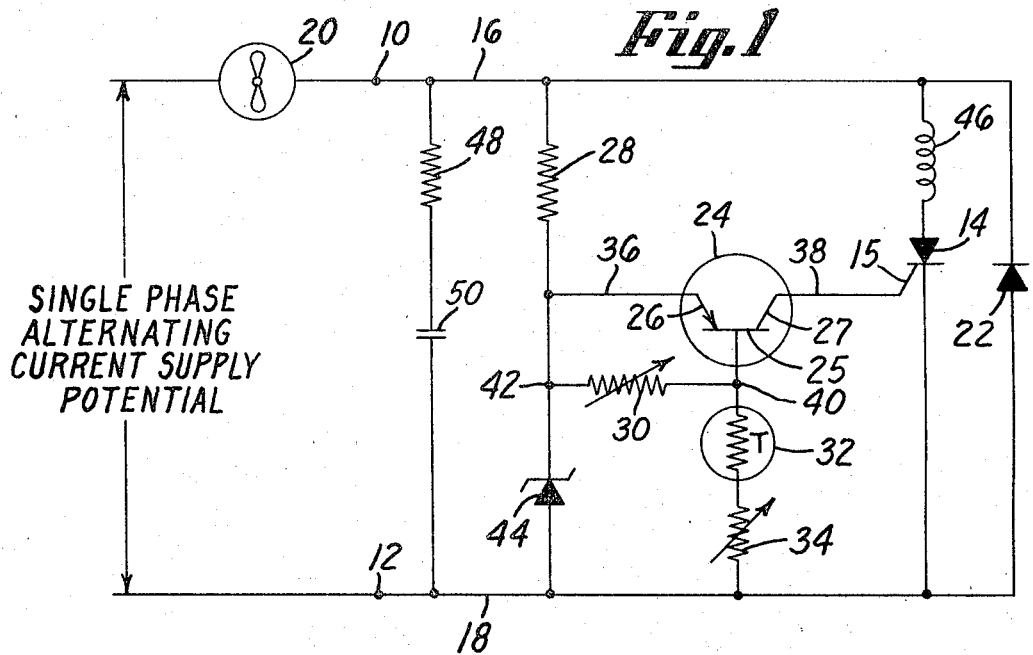
Figure 2:
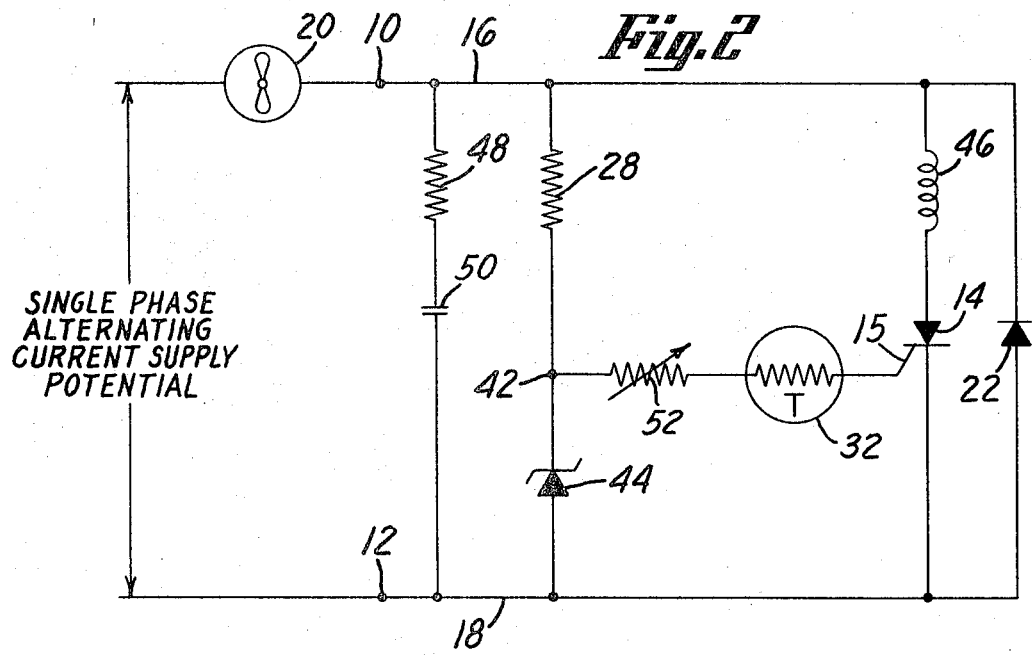

For a better understanding of the present invention, together with additional objects, advantages and features thereof, reference is made to the following description and accompanying drawings in which:

FIGURE 1 sets forth one embodiment of the novel speed control circuit of this invention in schematic form and, FIGURE 2 sets forth another embodiment of the novel speed control circuit of this invention in schematic form.

The speed of a single phase alternating current induction motor may be precisely controlled by varying the portion of selected half cycles of an alternating supply potential over which current flows through the motor. To do this, the combination of a controllable switching device of the type which may be triggered to conduction by a control signal, for establishing a circuit for the motor, and an arrangement for producing the required control signal at any selected electrical angle of selected half cycles of the alternating current supply potential may be employed. The control signal triggers the switching device to conduction at the selected electrical angle of the selected half cycles which establishes a circuit for the motor and the device conducts over the remainder of the selected half cycles. With this arrangement, the greater the portion of the selected half cycles over which the switching device conducts, the greater the speed of the motor.

Referring to the figures, wherein like elements have been given like characters of reference, alternate embodiments of the novel speed control circuit of this invention are set forth in schematic form. Each embodiment includes circuitry suitable for connection to external circuitry, a controllable switching device of the type having two current carrying electrodes and a control electrode and characterized by the ability to be triggered to conduction upon the application of a control signal to the control electrode thereof for establishing a circuit for the motor during the selected half cycles of the alternating current supply potential and an arrangement for producing the required control signal at any selected electrical angle of the selected half cycles of an alternating current supply potential.

The circuitry suitable for electrical connection to external circuitry may be conventional terminals, referenced in the figures by numerals 10 and 12, but which may be of any other suitable form.

The controllable switching device may be a silicon controlled rectifier, referenced in the figures by numeral 14, having two current carrying electrodes and a control electrode referenced by the numeral 15.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction upon the application, to the control electrode thereof, of a control signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. In the conducting state, therefore, the silicon controlled rectifier functions as a conventional diode. Upon being triggered to conduction, however, the control electrode is no longer capable of affecting the device which will remain in the conducting state until either the anode-cathode circuit is interrupted or the polarity of the potential applied across the anode-cathode electrodes is reversed.

The silicon controlled rectifier is one example of a controllable switching device suitable for this application. It is to be specifically understood that alternative controllable switching devices having similar electrical characteristics may be employed without departing from the spirit of the invention.

For purposes of describing the novel features of the circuit of this invention, and without intention or inference of a limitation thereto, the selected half cycles of the alternating current supply potential during which the controllable switching device is to be triggered to conduction by the control signal produced at any selected electrical angle thereof will be those half cycles during which terminal 10 is of a positive polarity and terminal 12 is of a negative polarity.

Referring to FIGURE 1, a preferred embodiment of the novel speed control circuit of this invention is set forth in schematic form.

The anode electrode of silicon controlled rectifier 14 is connected to terminal 10 through line 16 and the cathode electrode of silicon controlled rectifier 14 is connected to terminal 12 through line 18. Therefore, over those selected half cycles of the single phase alternating current supply potential during which terminal 10 is of a positive polarity and terminal 12 is of a negative polarity, silicon controlled rectifier 14 is forward poled.

Either of terminals 10 or 12 may be connected to one side of a source of single phase, alternating current supply potential and a conventional single phase alternating current motor 20 may be connected in series between the other of terminals 10 or 12 and the other side of the supply potential line. In FIGURE 1, motor 20 is shown to be connected in series between one side of the alternating current potential supply line and terminal 10.

So that full supply potential is applied to motor 20 during the alternate half cycles of the alternating current supply potential when terminal 10 is of a negative polarity and terminal 12 is of a positive polarity, a conventional diode 22 is connected in parallel with and poled in a direction opposite to silicon controlled rectifier 14 across terminals 10 and 12 through lines 16 and 18, respectively.

To produce the required control potential at any selected electrical angle of the selected half cycles of the alternating current supply potential, the combination of a type PNP transistor 24, having the usual base 25, emitter 26 and collector 27 electrodes, and an impedance network connected across terminals 10 and 12 may be employed.

In FIGURE 1, this impedance network is set forth as the series combination of a variable resistor 30, a variable resistance element 32, which may be sensitive to the influence of external forces such as a conventional thermistor, and variable resistor 34 connected across terminals 10 and 12 through line 16, resistor 28 and line 18. It is to be specifically understood that other impedance elements or combination of impedance elements may be substituted for these resistance elements without departing from the spirit of the invention.

In this impedance network, variable resistors 30 and 34 are inserted for purposes of precisely calibrating the circuit and thermistor 32 provides the variable impedance which determines the precise electrical angle of the selected half cycles at which the control signal for silicon controlled rectifier 14 will be produced. As variable resistors 30 and 34 are employed for calibration purposes only, they may be considered fixed resistors after the circuit has been calibrated as they will thereafter be changed only to change circuit calibration.

With other applications, variable resistor 34 may be omitted from this circuit and a fixed resistor may be substituted for variable resistor 30 if precise calibration is unnecessary. With this arrangement, the series combination of one impedance element and one variable impedance element would be connected across terminals 10 and 12.

Resistor 28 may be required to reduce the potential appearing across terminals 10 and 12 to a magnitude compatible with the biasing requirements of transistor 24. With some applications, resistor 28 may not be required.

The emitter-collector electrodes 26 and 27, respectively, of transistor 24 are connected across terminals 10 and 12 through line 16, resistor 28, lead 36, lead 38, the gate-cathode junction controlled rectifier 14 and line 18. Therefore, the emitter-collector electrodes of type PNP transistor 24 are forward poled over those selected half cycles of the alternating current supply potential during which terminal 10 is of a positive polarity and terminal 12 is of a negative polarity. The emitter electrode 26 of transistor 24 may be connected to terminal 10 through line 16 with other applications in which dropping resistor 28 is not required. The base electrode 25 of transistor 24 is connected to junction 40 between resistors 30 and 32. In applications in which the series combination of one impedance element and a variable impedance element is connected across terminals 10 and 12, base electrode 25 of transistor 24 would be connected to the junction therebetween which corresponds to junction 40 of FIGURE 1.

To stabilize the potential appearing across the impedance network comprising resistors 30, 32 and 34, a Zener diode 44 may be connected between junction 42 and terminal 12 and poled in a direction as shown in FIGURE 1. With this arrangement, when the potential at junction 42, in resepect to that at terminal 12, is of a magnitude equal to or greater than the rated inverse breakdown potential of Zener diode 44, this device conducts in a reverse direction and stabilizes the potential present at junction 42 in respect to that at terminal 12. Zener diode 44 may be replaced by a conventional diode, forward poled, if potentials of a magnitude less than those obtainable with a Zener diode are required.

Coil 46 connected in series between line 16 and the anode electrode of silicon controlled rectifier 14 and the series combination of resistor 48 and capacitor 50 connected across terminals 10 and 12 may be inserted in this circuit for the purpose of suppressing the radio frequency radiation which may be produced by sicilcon controlled rectifier 14. These elements, however, are not critical to the operation of the novel speed control circuit of this invention.

Over those half cycles of the alternating current supply potential during which terminal 10 is of a negative polarity and terminal 12 of a positive polarity, full line potential is applied across motor 20 and current flows therethrough over the complete half cycle through diode 22 which is forward poled during these half cycles.

In the circuit schematicaly set forth in FIGURE 1, over those half cycles of the alternating current supply potential during which terminal 10 is of a positive polarity and terminal 12 is of a negative polarity, selected as the half cycles of the alternating current supply potential during which the controllable switching device is to be triggered to conduction, silicon controlled rectifier 14 is forward poled but remains nonconductive, blocking current flow through motor 20, until triggered to conduction by the control signal, the emitter-collector electrodes of transistor 24 are forward poled, as previously described, and the potential of junction 40 is always of a polarity more negative than the potential upon emitter electrode 26, a condition which satisfies the base-emitter bias requirements for emitter-base current flow through a type PNP transistor, therefore, transistor 24 is conductive.

Emitter-collector current flow through transistor 24 of a magnitude equal to or greater than that required to produce sufficient gate current through the gate-cathode junction of silicon controlled rectifier 14 to trigger this device to conduction is the required control signal. Therefore, transistor 24 must conduct to a degree sufficient to produce this required control signal. The degree of conduction of transistor 24 is determined by the magnitude of the difference between the potential upon junction 40, applied to base electrode 25, and the potential present upon emitter electrode 26, the greater the magnitude of difference, the greater the degree of conduction of transistor 24.

The magnitude of the difference between the potential upon junction 40 and the potential present upon the emitter electrode 26 of transistor 24 is dependent upon the ratio between the impedance value of the impedance element or elements on one side of junction 40 and the impedance value of the impedance element or elements on the other side of junction 40 and the magnitude of the potential appearing across the impedance network between junction 42 and terminal 12 and may be varied by varying the magnitude of the potential across the impedance network and/or by varying the impedance ratio.

The alternating current supply potential applied across the impedance network increases in magnitude at substantially the same rate between known or readily determinable minimum and maximum limits with each selected half cycle. With a transistor 24 and a silicon controlled rectifier 14 of known characteristics, the impedance values of the elements of the impedance network may be selected to provide the magnitude of difference between the potentials upon junction 40 and emitter electrode 26 which will bias transistor 24 to that degree of conduction which is necessary to produce the required conrtol signal at a specific electrical angle between 0 degrees and 90 degrees of each selected half cycle of the alternating current supply potential. To selectively produce the control signal at any electrical angle between 0 degrees and 90 degrees of the selected half cycles of the alternating current supply potential, at least one variable impedance element may be included in the impedance network. In the circuit schematically set forth in FIGURE 1, the control signal may be produced at any selected electrical angle of the selected half cycles of the alternating current supply potential by varying the impedance value of element 32.

For the purpose of describing the operation of the circuit of FIGURE 1, it will be assumed that element 32 is a conventional thermistor device having a negative temperature coefficient of resistance and that motor 20 is to run at a lower speed as the temperature which influences thermistor 32 decreases.

Although Zener diode 44 maintains the potential appearing across junction 42 and line 18 essentially constant after the rated inverse breakdown potential has been exceeded, there is a slight increase in potential drop thereacross as reverse current flow therethrough increases as the magnitude of the supply potential increases over the first 90 electrical degrees of the selected half cycles. By properly calibrating the impedance network by the adjustment of elements 30 and 34, this slight increase in potential across Zener diode 44 may be advantageously employed to produce the proper degree of conduction through transistor 24 to trigger sliicon controlled rectifier 14 to conduction at any electrical angle between 0 and 90 degrees of each selected half cycle of the supply potential as determined by the resistance value of element 32.

With a decrease of influencing temperature, the resistance value of thermistor 32 increases and changes the ratio between the resistance value of variable resistor 30 and the resistance value of the series combination of thermistor 32 and variable resisor 34. As the resistance value of the series combination of thermistor 32 and variable resistor 34 increases with a decrease of influencing temperature, a greater proportion of the potential appearing across the impedance network is dropped across this series combination. Consequently, a greater magnitude of potential across the impedance network is necessary to provide the magnitude of difference between the potentials upon junction 40 and emitter electrode 26 which will bias transistor 24 to that degree of conduction which is necessary to produce the control signal required to trigger silicon controlled rectifier 14 to conduction. Therefore, silicon controlled rectifier 14 is triggered to conduction at the electrical angle later during each selected half cycle of the alternating current supply potential at which the supply potential has reached the greater magnitude, a condition which reduces the speed of motor 20 in that silicon controlled rectifier 14 is conducting over a smaller portion of each of the selected half cycles.

With an increase of influencing temperature, the resistance value of thermistor 32 decreases and changes the ratio between the resistance value of variable resistor 30 and the resistance value of the series combination of thermistor 32 and variable resistor 34. As the resistance value of the series combination of thermistor 32 and variable resistor 34 decreases with the decrease of influencing temperature, a smaller proportion of the potential appearing across the impedance network is dropped across this series combination. Consequently, a smaller magnitude of potential across the impedance network will provide the magnitude of difference between the potentials upon junction 40 and emitter electrode 26 which will bias transistor 24 to that degree of conduction which is necessary to produce the control signal required to trigger silicon controlled rectifier 14 to conduction. Therefore, siilcon controlled rectifier 14 is triggered to conduction at the electrical angle earlier during each selected half cycle of the alternating current supply potential at which the supply potential has reached the smaller magnitude, a condition which increases the speed of motor 20 in that silicon controlled rectifier 14 is conducting over a greater portion of each of the selected half cycles.

It is pointed out that the action of his circuit may be reversed by connecting thermistor 32 between calibrating potentiometer 30 and junction 40.

Silicon controlled rectifier 14 is reverse poled, and, therefore, extinguished during each alternate half cycle of the alternating current supply potential when terminal 10 is of a negative polarity and terminal 12 is of a positive polarity.

Referring to FIGURE 2, an alternate embodiment of the novel speed control circuit of this invention is set forth in schematic form.

In this circuit, transistor 24 is omitted and the series combination of variable resistance element 32, variable resistor 52 and dropping resistor 28 is connected between the control electrode 15 of silicon controlled rectifier 14 and terminal 10. As in the circuit of FIGURE 1, dropping resistor 28 may be included in this circuit to provide a potential at junction 42 which is compatible with the potential ratings of the devices employed in the circuit and variable resistor 52 may be included for calibration purposes. With other applications, dropping resistor 28 and calibrating variable resistor 52 may be omitted and the variable impedance element 32 connected between control electrode 15 of silicon controlled rectifier 14 and terminal 10.

Current flow through the series circuit including dropping resistor 28, calibrating variable resistor 52, variable resistance element 32 and the gate-cathode junction of silicon controlled rectifier 14 connected between terminals 10 and 12 of a magnitude equal to or greater than that required to produce sufficient gate current through the gate-cathode junction of silicon controlled rectifier 14 to trigger this device to conduction is the required control signal.

The alternating current supply potential applied across terminals 10 and 12 increases at substantially the same rate between known or readily determinable minimum and maximum limits with each selected half cycle. To produce the control signal at any selected electrical angle of the selected half cycles of the alternating current supply potential, variable impedance element 32 is varied.

For the purpose of describing the operation of the circuit of FIGURE 2, it will be assumed that element 32 is a conventional thermistor device having a negative temperature coefficient of resistance and that motor 20 is to run at a lower speed as the temperature which influences thermistor 32 decreases.

With a decrease of influencing temperature, the resistance value of thermistor 32 increases. Consequently, a greater magnitude of potential across terminals 10 and 12 is necessary to provide the control signal required to trigger silicon controlled rectifier 14 to conduction. Therefore, silicon controlled rectifier 14 is triggered to conduction at the conduction angle later during each selected half cycle of the alternating current supply potential at which the supply potential has reached a magnitude sufficiently high to produce the required control signal, as determined by the resistance value of thermistor 32, a condition which reduces the speed of motor 20 in that silicon controlled rectifier 14 is conducting over a smaller portion of each of the selected half cycles.

With an increase of influencing temperature, the resistance value of thermistor 32 decreases. Consequently, a smaller magnitude of potential across terminals 10 and 12 will provide the control signal required to trigger silicon controlled rectifier 14 to conduction. Therefore, silicon controlled rectifier 14 is triggered to conduction at the conduction angle earlier through each selected half cycle of the alternating current supply potential at which the supply potential has reached the smaller required magnitude, as determined by the resistance value of thermistor 32, a condition which increases the speed of motor 20 in that silicon controlled rectifier 14 is conducting over a greater portion of each of the selected half cycles.

Silicon controlled rectifier 14 is extinguished during the alternate half cycles of alternating current supply potential as previously set forth.

While the variable resistance element has been illustrated in the figures to be a thermistor device having a negative temperature coefficient of resistance, it is to be understood that other variable resistance elements may be substituted therefor. The novel speed control circuit of this invention may be made responsive to pressure, illumination, temperature, potential, current or any other physical quantity which may be electrically translated through proper circuit techniques.

Specific semiconductor devices and polarities have been set forth in this specification to clearly describe the operation of the novel circuit of this invention. It is to be specifically understood that alternative devices having similar electrical characteristics and compatibly poled may be substituted therefor without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A speed control circuit for single phase alternating current induction motors comprising first and second circuit means suitable for connection to external circuitry, a silicon controlled rectifier having two current carrying electrodes and a gate electrode, means for connecting said current carrying electrodes across said first and second circuit means, a diode, means for connecting said diode across said first and second circuit means in parallel with and poled in a direction opposite to said silicon controlled rectifier, a resistor, first and second variable resistors, a thermistor, means for connecting the series combination of said resistor, said first variable resistor, said thermistor and said second variable resistor in series across said first and second input circuit means in that order, a transistor having base, emitter and collector electrodes, means for connecting said emitter-collector electrodes across a junction between said first resistor and said first variable resistor and said gate electrode of said silicon controlled rectifier, means for connecting said base electrode to a junction between said first variable resistor and said thermistor, a Zener diode and means for connecting said Zener diode across a junction between said first resistor and said first variable resistor and one of said first and second input circuit means and poled in such a manner to be reverse biased while said junction between said first resistor and said first variable resistor is of a positive polarity.

References Cited

UNITED STATES PATENTS

| | | | |
|---|---|---|---|
| 3,225,280 | 12/1965 | Happe et al. | 318—345 XR |
| 3,242,410 | 3/1966 | Cockrell | 318—345 XR |
| 3,324,372 | 6/1967 | Myers | 318—227 |

OTHER REFERENCES

Home Appliance Builder, August 1964, pp. 13–15, 38, Copy in Group 210.

ORIS L. RADER, *Primary Examiner.*

G. Z. RUBINSON, *Assistant Examiner.*